United States Patent
Matsuyama et al.

(10) Patent No.: US 8,947,780 B2
(45) Date of Patent: Feb. 3, 2015

(54) POLARIZATION MODULE AND IMAGE DISPLAY APPARATUS

(75) Inventors: Norihiro Matsuyama, Kanagawa (JP); Ryoko Horikoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 326 days.

(21) Appl. No.: 13/480,664

(22) Filed: May 25, 2012

(65) Prior Publication Data
US 2012/0307359 A1    Dec. 6, 2012

(30) Foreign Application Priority Data
Jun. 1, 2011    (JP) .................................. 2011-123707

(51) Int. Cl.
*G02B 27/26* (2006.01)
*G02B 5/30* (2006.01)
*H04N 13/04* (2006.01)

(52) U.S. Cl.
CPC ............ *G02B 27/26* (2013.01); *H04N 13/0434* (2013.01)
USPC ...................................... 359/465; 359/490.02

(58) Field of Classification Search
None
See application file for complete search history.

(56) References Cited

U.S. PATENT DOCUMENTS

| | | | |
|---|---|---|---|
| 5,537,144 A * | 7/1996 | Faris | 348/58 |
| 6,384,971 B1 * | 5/2002 | Faris | 359/486.02 |
| 2010/0066927 A1 * | 3/2010 | Chang | 349/15 |

FOREIGN PATENT DOCUMENTS

| | | |
|---|---|---|
| JP | 2004-109528 | 4/2004 |
| JP | 2005-173033 | 6/2005 |

* cited by examiner

*Primary Examiner* — Jade R Chwasz
(74) *Attorney, Agent, or Firm* — Hazuki International, LLC (57) ABSTRACT

A polarization module includes: a polarizer; a plurality of first quarter-wave plates disposed over the polarizer such that their optical axes are tilted at 45 degrees with respect to the polarization axis of the polarizer; a plurality of second quarter-wave plates disposed over the polarizer such that their optical axes are tilted at 45 degrees with respect to the polarization axis of the polarizer in the direction opposite to the tilting direction of the optical axes of the first quarter-wave plates; and a transparent resin plate disposed over the plurality of first quarter-wave plates and the plurality of second quarter-wave plates and having optical isotropy.

14 Claims, 4 Drawing Sheets

POLARIZATION MODULE AND IMAGE DISPLAY APPARATUS

FIELD

The present disclosure relates to a polarization module for displaying a three-dimensional image and an image display apparatus utilizing the module.

BACKGROUND

Recently, image display apparatuses for providing three-dimensional images are being developed. Such an image display apparatus displays an image associated with each of the left and right eyes of a viewer based on parallax between the eyes. For example, the viewer can view a three-dimensional image by wearing glasses, i.e., lenses for the right and left eyes of the viewer provided with a filter for selectively transmitting light from the image for the right eye and a filter for selectively transmitting light from the image for the left eye, respectively.

For example, the image for the right eye and the image for the left eye are displayed based on beams of light which are polarized in different directions such that each beam can be selected by either of the above-described filers (for example, see JP-A-2004-109528 (Patent Document 1)).

For example, Patent Document 1 has disclosed the use of two types of linearly polarized light polarized in directions which are 90 degrees different from each other to provide images for the right and left eyes of a viewer separately.

Specifically, light from a liquid crystal panel is converted into linearly polarized light by a polarizer. Next, a part of the linearly polarized light is transmitted through a retardation film to rotate the polarization direction of the light at 90 degrees to provide, for example, light of an image for the right eye. On the contrary, the rest of the linearly polarized light is not transmitted through the retardation film, and the light undergoes no change in the polarization direction thereof, the light being rendered as an image for the left eye. Thus, the viewer is presented with light of an image for the right eye and light of an image for the left eye which are polarized in directions 90 degrees different from each other.

The viewer may view a three-dimensional image by wearing glasses, i.e., a lens for the right eye and a lens for the left eye on which a polarization filter transmitting linearly polarized light for the right eye and a polarization filter transmitting linearly polarized light for the left eye are disposed, respectively.

JP-A-2005-173033 (Patent Document 2) has disclosed the use of such a retardation film (wave plate filter) disposed in the form of a strip in association with every other horizontal line of pixels of a liquid crystal display unit.

SUMMARY

As thus described, an image display apparatus for presenting a three-dimensional image must have members such as a polarizer and a retardation film as described above for obtaining light beams for left and right eyes separately which are not provided in two-dimensional image display apparatus according to the related art.

Such members must have high endurance against the environment thereof because they are disposed on an image display surface of an image display apparatus.

Under the circumstances, it is desirable to provide a polarization module having high endurance against the environment thereof and an image display apparatus having such a module.

An embodiment of the present disclosure is directed to a polarization module including a polarizer and a plurality of first quarter-wave plates disposed over the polarizer such that their optical axes are tilted at 45 degrees with respect to the polarization axis of the polarizer.

The polarization module according to the embodiment also includes a plurality of second quarter-wave plates disposed over the polarizer such that their optical axes are tilted at 45 degrees with respect to the polarization axis of the polarizer in the direction opposite to the tilting direction of the optical axes of the first quarter-wave plates.

The polarization module according to the embodiment further includes a transparent resin plate disposed over the plurality of first quarter-wave plates and the plurality of second quarter-wave plates and having optical isotropy.

Another embodiment of the present disclosure is directed to an image display apparatus including a display panel having a first pixel region for displaying an image for a right eye and a second pixel region for displaying an image for a left eye and including a polarization module as described above disposed on the display panel.

The first quarter-wave plates are disposed to face the first pixel region of the display panel, and the second quarter-wave plates are disposed to face the second pixel region of the display panel.

In the polarization module and the image display apparatus according to the embodiments of the present disclosure, the first quarter-wave plates and the second quarter-wave plates are covered by the transparent resin plate having optical isotropy. Thus, the first quarter-wave plates and the second quarter-wave plates can be protected without any adverse effect on polarized beams of light associated with the right and left eyes of a viewer.

The polarization module and the image display apparatus according to the embodiments of the present disclosure have high endurance to environmental conditions.

DETAILED DESCRIPTION

Embodiments of the present disclosure will now be described. The present disclosure is not limited to the embodiments described below.

The following items will be described in the order listed.

1. First Embodiment (Embodiment Having One-Dimensionally Arranged Wave Plates)
2. Second Embodiment (Embodiment Having Two-Dimensionally Arranged Wave Plates)

3. Third Embodiment (Embodiment Having Composite Plate)

4. Fourth Embodiment (Embodiment of Image Display Apparatus)

1. First Embodiment

Embodiment Having One-Dimensionally Arranged Wave Plates

Figure 1A:
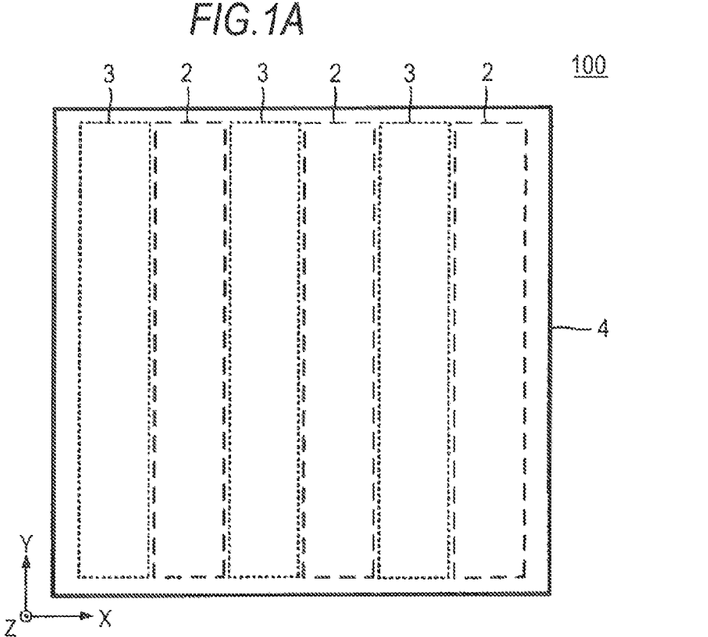
FIGS. 1A to 1C are schematic views of a polarization module according to a first embodiment of the present disclosure showing a configuration of the module.
Figure 1B:
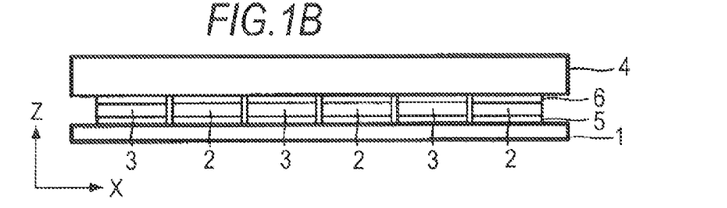
Figure 1C:
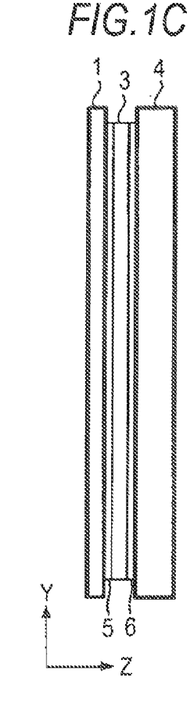

FIGS. 1A to 1C are schematic views of a polarization module 100 according to a first embodiment of the present disclosure showing a configuration thereof. FIG. 1A is a view of the polarization module 100 taken in a direction (a direction along Z-axis) perpendicular to one of principal surfaces of the module. FIG. 1B is a view of the polarization module 100 taken in a direction along Y-axis. FIG. 1C is a view of the polarization module 100 taken in a direction along X-axis.

The polarization module 100 of the present embodiment includes a polarizer 1, a plurality of first wave plates 2 (first quarter-wave plates) and a plurality of second wave plates 3 (second quarter-wave plates) disposed on one of principal surfaces of the polarizer 1, and a resin plate 4 disposed on the plurality of first wave plates 2 and second wave plates 3.

There is no particular restriction on the polarizer 1 as long as it transmits light having a predetermined polarization direction only. For example, a typical polarizer used in image display apparatus is formed by a uniaxially oriented film and protective films applied to both sides of the film. The uniaxially oriented film is obtained from a resin which includes iodine and a dichroic substance such as a dichroic pigment and which is primarily composed of polyvinyl alcohol (PVA). The polarizer 1 of the present embodiment may be similar in configuration to such a typical polarizer.

The plurality of first wave plates 2 and the plurality of second wave plates 3 are disposed on one of principal surfaces of the polarizer 1. The first wave plates 2 and the second wave plates 3 are secured to the polarizer 1 through a bonding layer 5. The bonding layer 5 is formed by, for example, an optical adhesive, an ultrasonic curing resin, an optical elasticity resin, or an optical adhesive tape.

Identical quarter-wave plates may be used as the first wave plates 2 and the second wave plates 3.

The first wave plates 2 are disposed such that their optical axes are tilted at an angle of +45 degrees with respect to the polarization axis of the polarizer 1. The second wave plates 3 are disposed such that their optical axes are tilted at an angle of −45 degrees with respect to the polarization axis of the polarizer 1. That is, the second wave plates 3 are disposed such that their optical axes are tilted at an angle of 45 degrees with respect to the polarization axis of the polarizer 1 in the direction opposite to the direction in which the optical axes of the first wave plates 2 are tilted.

Therefore, the second wave plates 3 are identical to the first wave plates 2 except that they are disposed on the polarizer 1 such that they appear upside down compared to the wave plates 2.

It is preferable to eliminate any gap between each pair of first wave plate 2 and second wave plate 3 adjacent to each other. For example, when a gap is left, a layer of air intervenes between the resin plate 4 and the polarizer 1. Then, reflection is more likely to occur at an interface between the resin plate 4 and the layer of air and an interface between the layer of air and the polarizer 1, and an unwanted image may consequently be formed by reflected light (reflected image).

As shown in FIG. 1A, each of the first wave plates 2 and the second wave plates 3 has a rectangular principle surface, and the first wave plates 2 and the second wave plates 3 are arranged such that they alternate in the extending direction of the shorter sides of the wave plates.

A transparent resin plate 4 having light transmitting properties is disposed on the plurality of first wave plates 2 and the plurality of second wave plates 3. The resin plate 4 preferably has optical isotropy. Thus, the plate can protect the first wave plates 2 and the second wave plates 3 without affecting polarized light transmitted through each of the first wave plates 2 and the second wave plates 3.

For example, the resin plate 4 having optical isotropy may be made of polymethyl methacrylate (PMMA). Such a resin plate 4 is advantageous especially when the polarization module 100 is mounted to a display panel having a large screen because the plate is lighter and less liable to crack when compared to, for example, a glass plate.

The resin plate 4 is secured to the first wave plates 2 and the second wave plates 3 through a bonding layer 6. The bonding layer 6 may be the same material used as the bonding layer 5. The resin plate 4 disposed on the first wave plates 2 and the second wave plates 3 provides the polarization module 100 with a planar top surface.

Figure 2:
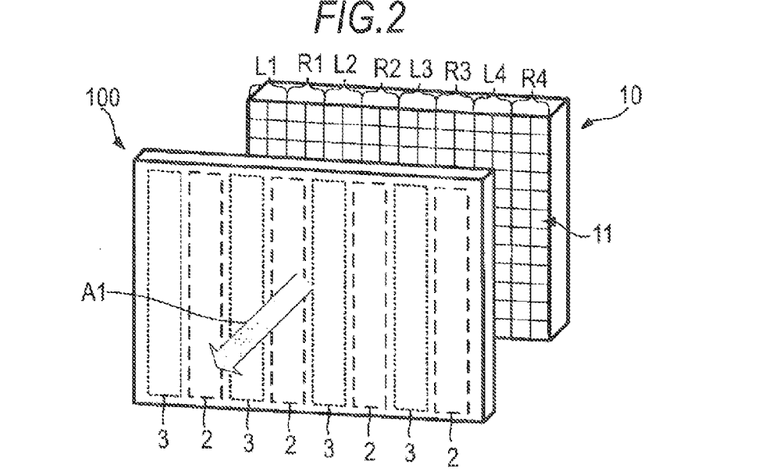
FIG. 2 is an illustration of the polarization module according to the first embodiment of the present disclosure and a display panel.

As shown in FIG. 2, the polarization module 100 is mounted over an image display surface of a display panel 10. At this time, the polarization module 100 is disposed such that the polarizer 1 of the module faces the display panel 10. Light emitted from the display panel 10 is transmitted through the polarization module 100 as indicated by an arrow A1 to reach the eyes of a viewer.

For example, pixels 11 in three primary colors red (R), green (G), and blue (B) are disposed in the form of a matrix on the image display surface of the display panel 10. The pixels 11 may be liquid crystal display pixels, and the pixels may alternatively be constituted by self-emitting elements such as LEDs (light emitting diodes) or organic EL (electro-luminescence) display devices when a display screen having a great surface area is to be formed.

Among the pixels 11, the pixels arranged in first pixel regions or columns R1 to R4 display an image for the right eye of a viewer, and the pixels arranged in second pixel regions or columns L1 to L4 display an image for the left eye.

Since the polarization module 100 is disposed over the display panel 10, for example, the first wave plates 2 are disposed over the first pixel regions or the columns R1 to R4, and the second wave plates 3 are disposed over the second pixel regions or the columns L1 to L4.

FIGS. 1A to 1C and FIG. 2 schematically show the polarization module 100 and the display panel 10, and the size and the number of each of the constituent members such as the first wave plates 2, the second wave plates 3, and the pixels 11 may be changed as occasion demands.

Light emitted from the pixels disposed in the first pixel regions or the columns R1 to R4 is transmitted through the polarizer 1 of the polarization module 100 to become linearly polarized light, and the light thereafter impinges on the first wave plates 2. Since the optical axes of the first wave plates 2 are tilted at 45 degrees with respect to the polarization axis of the polarizer 1, the light transmitted through the first wave plates 2 becomes circularly polarized light.

Light emitted from the pixels disposed in the second pixel regions or the columns L1 to L4 is transmitted through the polarizer 1 to become linearly polarized light, and the light thereafter impinges on the second wave plates 3. Since the optical axes of the second wave plates 3 are tilted at 45 degrees with respect to the polarization axis of the polarizer 1 in the direction opposite to the direction in which the optical axes of the first wave plates 2 are tilted. Therefore, the light transmitted through the second wave plates 3 becomes circularly polarized light having a rotating direction opposite to the rotating direction of the light transmitted through the first wave plate 2.

As thus described, the light emitted from the pixels disposed in the first pixel regions or the columns R1 to R4 and the light emitted from the pixels disposed in the second pixel regions or the columns L1 to L4 become circularly polarized light beams having rotating direction opposite to each other by being transmitted through the polarization module 100.

A viewer can view a three-dimensional image by wearing glasses including a circularly polarized light filter transmitting circularly polarized light from the pixel regions of the columns L1 to L4 disposed in association with the left eye and a circularly polarized light filter transmitting circularly polarized light from the pixel regions of the columns R1 to R4 disposed in association with the right eye.

According to the related art, when a three-dimensional image is to be displayed, for example, on a display apparatus having a large screen whose pixels are constituted by LEDs, one quarter-wave plate is fitted into each of metal frames or resin frames formed like a mesh in accordance with the arrangement of the LEDs. It is therefore difficult to arrange the plurality of polarizers fitted into the metal frame or resin frame on the same plane, which has resulted in a difficulty in providing a display apparatus with a planar surface.

In contrast, according to the present embodiment, a plurality of the first wave plates 2 and the second wave plates 3 are covered by one resin plate 4, so that the polarization module 100 can be provided with a planar surface.

A functional film such as an anti-reflection film, ultraviolet cutoff film or a bar coat film may be formed on a surface of the resin plate 4. It is preferable to provide an anti-reflection film on a principal surface of the polarizer 1 opposite to the surface thereof facing the resin plate 4. For example, when the polarization module 100 is mounted to a display panel, an air gap is formed between the polarizer 1 and the display panel. Then, reflection is likely to occur at the interface between the polarizer 1 and the air, and it is therefore desirable to provide an anti-reflection film in a position as described above. Such an anti-reflection film may be omitted when the above-described air gap is filled with an optical adhesive.

Fine convexes and concaves may be formed as an anti-glare process when the resin plate 4 is molded.

Various surface treatments as described above can be easily provided by disposing the resin plate 4 on the surface of the polarization module 100. In particular, it is preferable to provide the resin plate 4 with the ultraviolet cutoff function because the function protects the first wave plates 2 and the second wave plates 3 (quarter-wave plates) which are relatively vulnerable to ultraviolet rays. Further, the resin plate 4 may include an ultraviolet cutoff agent.

Figure 3:
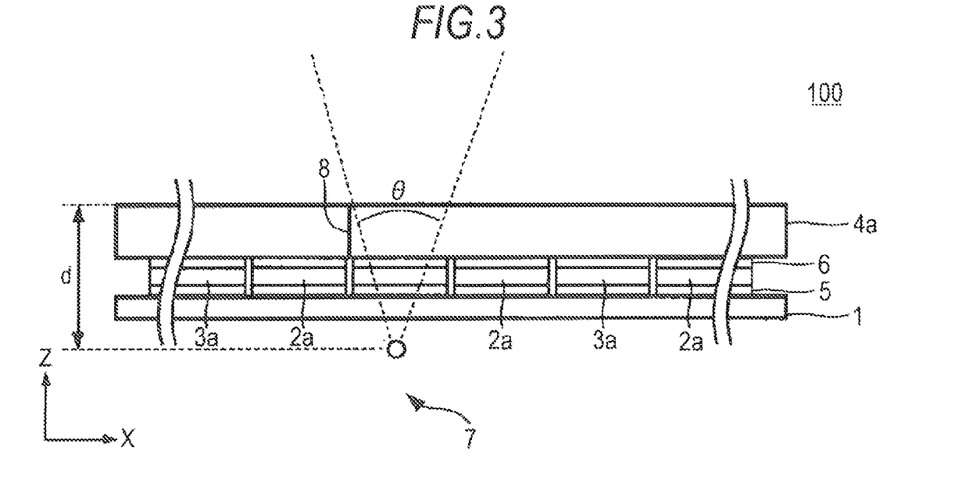
FIG. 3 is an illustration of a polarization module formed by joining a plurality of resin plates.

A plurality of resin plates may be joined to form a polarization module to be used for a display panel having a large screen. FIG. 3 is a schematic view of a polarization module 100 showing a configuration thereof in which a plurality of resin plates 4a are joined together.

Preferably, Expression (1) shown below is true where "p" represents the pitch of pixels of the display panel; a light source of the display panel is a point light source 7; the display panel has a viewing angle θ; "d" represents the distance of the point light source 7 from a surface of a resin plate 4a opposite to a surface of the plate on the side where first wave plates 2a and second wave plates 3a are provided, as shown in FIG. 3A.

$$0.8 \text{ (mm)} < d < X\tan((\pi - \theta)/2) \text{ (mm)} \quad (1)$$

$$(X = p/2)$$

When the distance d is equal to or greater than X tan((π−θ)/2), light from a pixel (point light source 7) within the viewing angle θ may impinge on a joint 8 between the resin plates 4a.

When the light incident on the joint 8 is scattered or reflected by at the joint 8, it is difficult to view an image from the direction in which the light had traveled until immediately before the incidence thereof on the joint 8. It is therefore preferable to keep the distance d smaller than X tan((π−θ)/2).

When the thickness of the resin plate 4a is too small, the hardness of the resin plate 4a may be insufficient because the plate is thin like a film. As a result, it is difficult to keep the flatness and the strength of the polarization module 100 sufficient even if the resin plates 4a are disposed on the first wave plates 2 and the second wave plates 3. Therefore, the distance d is preferably greater than 0.8 mm.

As shown in FIGS. 1A to 1C, all of the first wave plates 2 and the second wave plates 3 of the polarization module 100 of the present embodiment are disposed on the single polarizer 1.

When a plurality of polarizers having the same shape as the first and second wave plates are combined with the plurality of first wave plates and the plurality of second wave plates in a one-to-one relationship, the total area of edge regions of the polarizers is great. Then, the polarizers are likely to start deteriorating at edge regions thereof.

One of resin materials making up a common polarizer is polyvinyl alcohol, and polyvinyl alcohol is very highly hydrophilic. When the total area of edge regions of the polarizers is great, polyvinyl alcohol can be eluted into water droplets and the like from edge regions of the polarizers in an environment having high humidity, which can result in deterioration of the polarizers.

In the polarization module 100 of the present embodiment, all of the first wave plates 2 and the second wave plates 3 are disposed on the single polarizer 1. Since the area of edge regions of the polarizer 1 can therefore be kept small, it is possible to prevent water-soluble components such as polyvinyl alcohol from being eluted into water from the edge regions. Thus, the module can be provided with high anti-humidity properties.

Since the polarization module 100 includes only one polarizer 1, the polarization module 100 can be provided with a planar surface and high mechanical strength.

2. Second Embodiment

Embodiment Having Two-Dimensionally Arranged Wave Plates

Depending on the arrangement of the pixels for left and right eyes of the display panel, changes may be made on the shape of the wave plates and the pattern in which the wave plates are disposed.

Figure 4A:
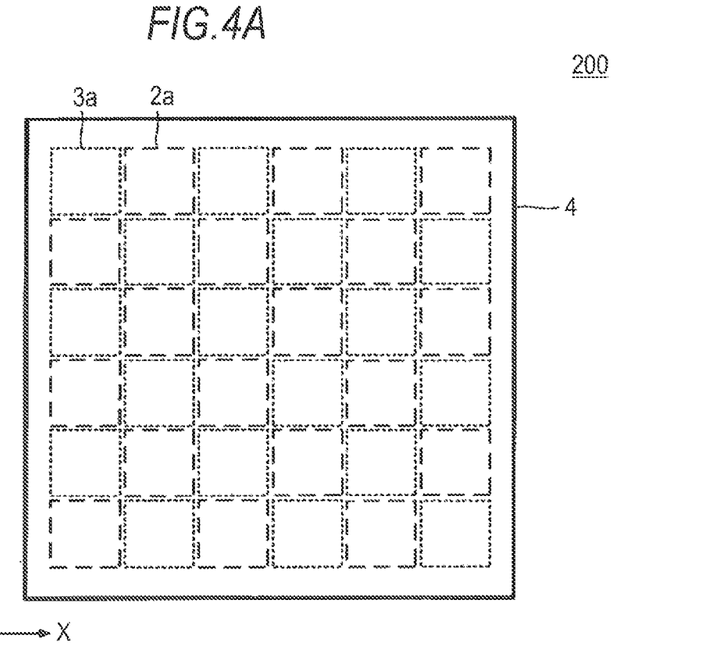
FIGS. 4A to 4C are schematic views of a polarization module according to a second embodiment of the present disclosure showing a configuration of the module.
Figure 4B:
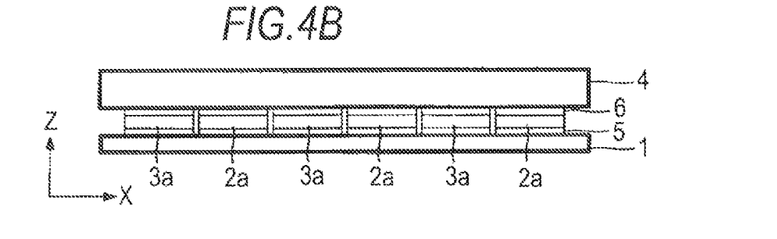
Figure 4C:
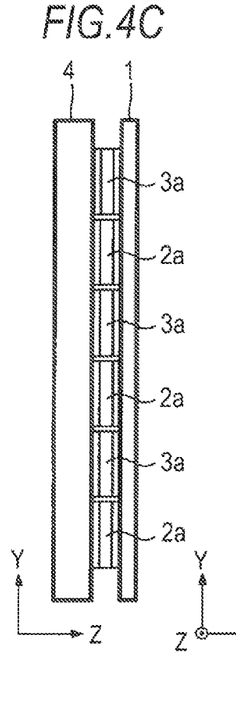

An exemplary case in which first and second wave plates are disposed in the form of a matrix (or in a checkerboard pattern) will now be described:

FIGS. 4A to 4C are schematic views of a polarization module 200 according to a second embodiment of the present disclosure showing a configuration thereof. FIG. 4A is a view of the polarization module 200 taken in a direction (a direction along Z-axis) perpendicular to one of principal surfaces of the module. FIG. 4B is a view of the polarization module 200 taken in a direction along Y-axis. FIG. 4C is a view of the polarization module 200 taken in a direction along X-axis.

A feature which is identical between the present embodiment and the first embodiment (see FIGS. 1A to 1C) will be indicated by the same reference numeral and will not be described to avoid duplicated description.

The polarization module 200 of the present embodiment includes one polarizer 1, first wave plates 2a, second wave plates 3a, and a resin plate 4. The features listed and bonding layers 5 and 6 for bonding the features may be basically similar in configuration to the polarizer 1, the first wave plates 2, the second wave plates 3, the resin plate 4, and the bonding layers 5 and 6 of the first embodiment, respectively. The shape and arrangement of the first wave plates 2a and the second wave plates 3a of the present embodiment are different from the shape and arrangement of the corresponding features of the first embodiment.

For example, the first wave plates 2a and the second wave plates 3a have a square outline when viewed in a light-emitting direction (a direction along Z-axis). The first wave plates 2a and the second wave plates 3a are disposed in an in-plane direction of the polarizer 1 such that they alternate in each of two axial directions orthogonal to each other (directions along X and Y axes of FIGS. 4A to 4C). That is, the first wave plates 2a and the second wave plates 3a are arranged in a so-called checkerboard pattern.

Such a polarization module 200 is mounted to a display panel having pixel regions for displaying an image for the left eye of a viewer and pixel regions for displaying an image for the right eye, the two types of pixel regions being arranged in a checkerboard pattern in the same way in which the first wave plates 2a and the second wave plates 3a are arranged. The number of pixels to be allocated to each first wave plate 2a and the number of pixels to be allocated to each second wave plate 3a may be set as desired. The size of the first wave plates 2a and the second wave plates 3a is determined according to the size of respective pixel regions of the display panel.

In the polarization module 200 of the present embodiment, all of the first wave plates 2a and the second wave plates 3a are disposed on the single polarizer 1. Since the area of edge regions of the polarizer 1 can therefore be kept small, the polarization module 200 can be provided with high anti-humidity performance.

The present embodiment provides other advantages which are similar to those of the first embodiment.

3. Third Embodiment

Embodiment Having Composite Plate

Figure 5A:
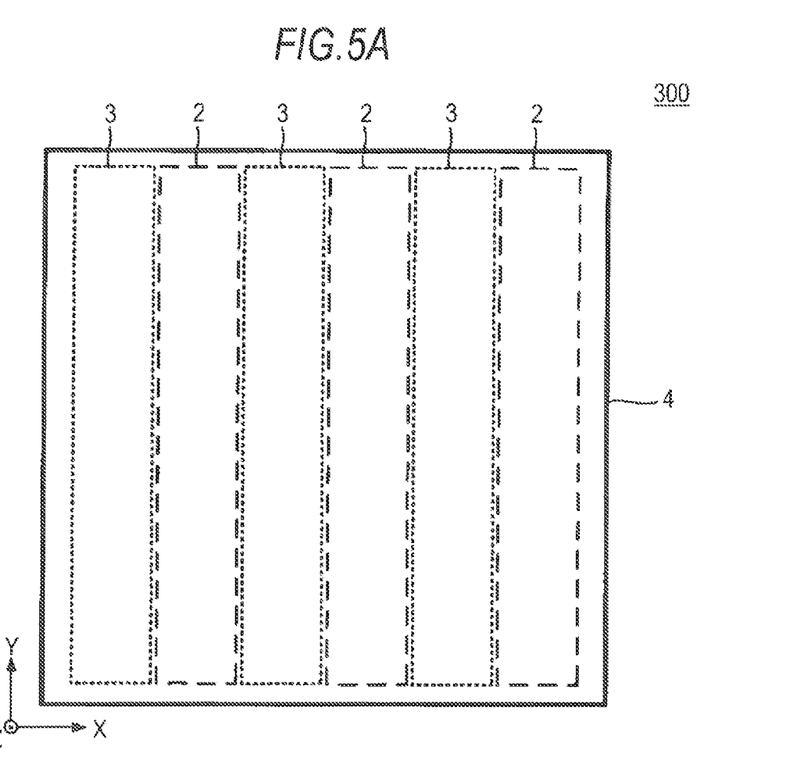
FIGS. 5A to 5C are schematic views of a polarization module according to a third embodiment of the present disclosure showing a configuration of the module.
Figure 5B:
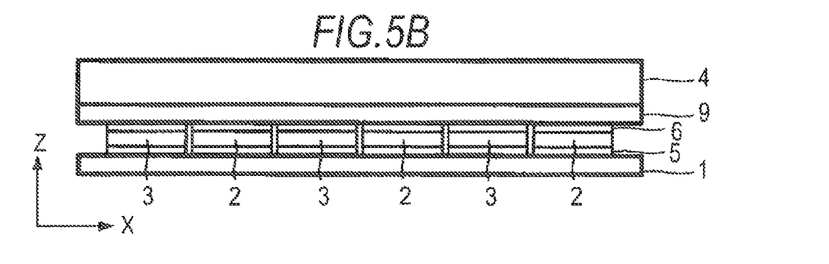
Figure 5C:
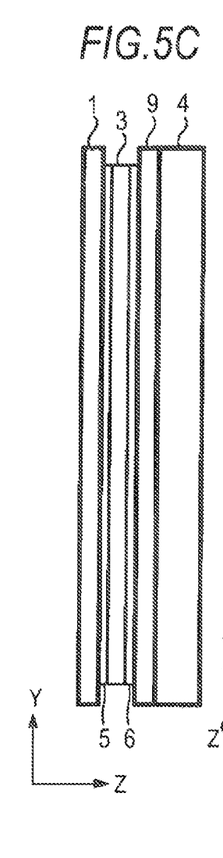

FIGS. 5A to 5C are schematic views of a polarization module 300 according to a third embodiment of the present disclosure showing a configuration thereof. FIG. 5A is a view of the polarization module 300 taken in a direction (a direction along Z-axis) perpendicular to one of principal surfaces of the module. FIG. 5B is a view of the polarization module 300 taken in a direction along Y-axis. FIG. 5C is a view of the polarization module 300 taken in a direction along X-axis.

A feature which is identical between the present embodiment and the first embodiment (see FIGS. 1A to 1C) will be indicated by the same reference numeral and will not be described to avoid duplicated description.

The polarization module 300 of the present embodiment is different from the module of the first embodiment (see FIGS. 1A to 1C) in that a reinforcement plate 9 formed of polycarbonate is disposed on a resin plate 4. The present embodiment is otherwise similar in configuration to the first embodiment.

For example, when a polarization module is to be mounted to a display panel in the open air, it is desirable for the polarization module to have high anti-shock properties. According to the present embodiment, a reinforcement plate 9 made of polycarbonate is disposed on a resin plate 4 to form a composite plate including plates of different types, whereby a polarization module 300 having high anti-shock properties can be obtained.

The reinforcement plate 9 is disposed on the side of the resin plate 4 where light from a display panel impinges on the resin plate. In other words, the plate 9 is disposed between a group of wave plates (first wave plates 2 and second wave plates 3) and the resin plate 4.

For example, when the reinforcement plate 9 is disposed on the side of the resin plate 4 where light from the display panel exits the plate, anisotropy exists between the resin plate 4 and the reinforcement plate 9, and the direction of polarization of light transmitted through the plates is affected by the anisotropy. On the contrary, when the reinforcement plate 9 is disposed between the group of wave plates (i.e., the first wave plates 2 and the second wave plates 3) and the resin plate 4, isotropy can be maintained between the resin plate 4 and the enforcement plate 9. Thus, any adverse effect on the direction of polarization of light transmitted through the plates can be prevented.

The reinforcement plate 9 is secured to the resin plate 4, the first wave plates 2, and the second wave plates 3 using, for example, an optical adhesive, an ultraviolet curing resin, an optical elasticity resin, or an optical adhesive tape.

Advantages of other features of the polarization modules 300 according to the present embodiment are the same as those of the first embodiment. The same advantage as the present embodiment can be obtained in the second embodiment (see FIGS. 4A to 4C) by disposing a reinforcement plate 9 between the group of wave plates, (the first wave plates 2 and the second wave plates 3) and the resin plate 4.

4. Fourth Embodiment

Embodiment of Image Display Apparatus

Figure 6:
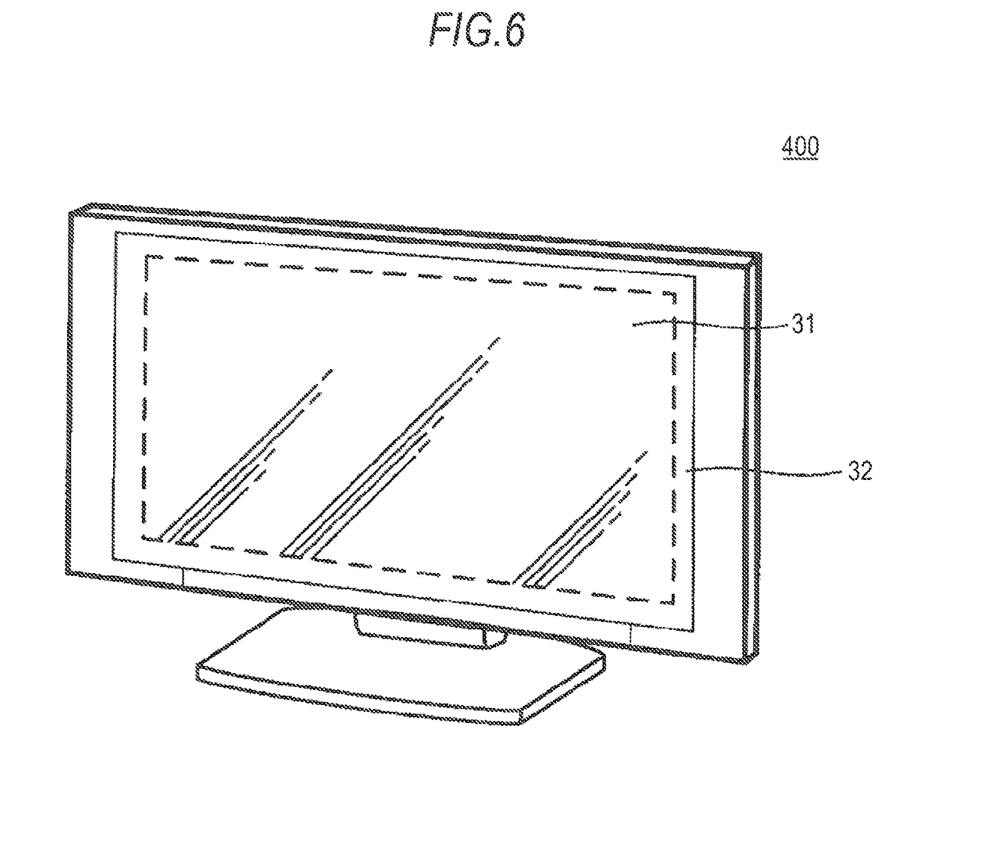
FIG. 6 is a perspective view of an image display apparatus according to a fourth embodiment of the present disclosure.

FIG. 6 is a perspective view of an image display apparatus 400 according to a fourth embodiment of the present disclosure. The image display apparatus 400 of the present embodiment includes a polarization module 32 disposed on an image display section 31 thereof.

The image display section 31 is constituted by, for example, a display panel 10 as described above as the first embodiment of the present disclosure (see FIG. 2). For example, the image display section 31 includes pixel areas which are defined at intersections between a plurality of scan lines and a plurality of signal lines disposed to extend in a direction orthogonal to the scan line, one pixel area being allocated to each intersection. At each pixel, for example, a semiconductor device for driving the pixel is disposed.

For example, the scan lines are connected to a scan line driving circuit which is not shown, and the semiconductor devices are turned on by a pulse voltage supplied from the scan line driving circuit.

When the semiconductor devices are turned on, video signals according to luminance information is supplied from a signal driving circuit to light emitting elements. The light emitting elements emit light with luminance according to current values of the video signals to display images.

Light emitting elements provided in the pixel regions of the display panel 10 for displaying images for the right and left eyes of a viewer are supplied with respective video signals associated with the images for the right and left eyes from the signal driving circuit.

For example, any of the polarization modules 100, 200, and 300 described above as the first, second, and third embodiments (see FIGS. 1A to 1C, FIGS. 4A to 4C, and FIGS. 5A to 5C) may be used as the polarization module 32.

In the polarization module 100, 200, or 300, one resin plate 4 is disposed on the first wave plates 2 and the second wave plates 3 as described above. Thus, the module can be provided with a planar surface, and the first wave plates 2 and the second wave plates 3 can be protected. The image display apparatus 400 of the present embodiment has high endurance to environmental conditions and capability of providing high quality three-dimensional images because it employs any of the polarization modules 100, 200, and 300 described above.

Embodiments of the polarization module and image display apparatus according to the present disclosure have been described. The present disclosure is not limited to the embodiments, and the present disclosure may be implemented in various alternative modes without departing from the spirit of the present disclosure described in the claims.

The present disclosure can be implemented as the following configurations.

(1) A polarization module including:
a polarizer;
a plurality of first quarter-wave plates disposed over the polarizer such that their optical axes are tilted at 45 degrees with respect to the polarization axis of the polarizer;
a plurality of second quarter-wave plates disposed over the polarizer such that their optical axes are tilted at 45 degrees with respect to the polarization axis of the polarizer in the direction opposite to the tilting direction of the optical axes of the first quarter-wave plates; and
a transparent resin plate disposed over the plurality of first quarter-wave plates and the plurality of second quarter-wave plates and having optical isotropy.

(2) The polarization module according to the item (1), wherein the resin plate may be formed of PMMA.

(3) The polarization module according to the item (1) or (2), which further includes a reinforcement plate formed of polycarbonate disposed between the wave plates, i.e., the plurality of first quarter-wave plates and the plurality of second quarter-wave plates, and the resin plate.

(4) The polarization module according to any of the items (1) to (3), which satisfies:

$$0.8(mm) < d < X\tan((\pi-\theta)/2) \text{ (mm)}$$

where "X" represents a value that is one half of the pitch of pixels of a display panel mounted to the surface of the polarizer opposite to the surface thereof facing the resin plate; "θ" represents the viewing angle of the pixels; a light source of the display panel is a point light source; "d" represents the distance of the point light source from the surface of the resin plate opposite to the surface of the plate on the side where first and second quarter-wave plates are provided.

(5) The polarization module according to any of the items (1) to (4), wherein the plurality of first quarter-wave plates and the plurality of second quarter-wave plates are disposed over a single polarizer.

(6) An image display apparatus including:
a display panel having a first pixel region for displaying an image for a right eye and a second pixel region for displaying an image for a left eye; and
a polarization module disposed on the display panel and having a polarizer, a plurality of first quarter-wave plates disposed over the polarizer such that their optical axes are tilted at 45 degrees with respect to the polarization axis of the polarizer, a plurality of second quarter-wave plates disposed over the polarizer such that their optical axes are tilted at 45 degrees with respect to the polarization axis of the polarizer in the direction opposite to the tilting direction of the optical axes of the first quarter-wave plates, and a transparent resin plate disposed over the plurality of first quarter-wave plates and the plurality of second quarter-wave plates and having optical isotropy, the display panel being mounted to a surface of the polarizer opposite to the side thereof where the resin plate is disposed, the plurality of first quarter-wave plates being disposed to face the first pixel region of the display panel, the plurality of second quarter-wave plates being disposed to face the second pixel region of the display panel.

(7) The image display apparatus according to the item (6), wherein the pixels are constituted by self-emitting elements such as LEDs or organic LEDs.

The present disclosure contains subject matter related to that disclosed in Japanese Priority Patent Application JP 2011-123707 filed in the Japan Patent Office on Jun. 1, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A polarization module comprising:
a polarizer;
a plurality of first quarter-wave plates disposed on a first side of the polarizer such that their optical axes are tilted at 45 degrees with respect to a polarization axis of the polarizer;
a plurality of second quarter-wave plates disposed on the first side of the polarizer such that their optical axes are tilted at 45 degrees with respect to the polarization axis of the polarizer in a direction opposite to the tilting direction of the optical axes of the plurality of first quarter-wave plates; and
a transparent resin plate having optical isotropy disposed on the plurality of first quarter-wave plates and the plurality of second quarter-wave plates,
wherein a distance between a light source of a display panel mounted on a second side of the polarizer and a surface of the transparent resin plate opposite to a surface facing the polarizer is set based on pitch of pixels of the display panel.

2. The polarization module according to claim 1, wherein the resin plate is formed of polymethyl methacrylate (PMMA).

3. The polarization module according to claim 1, further comprising a reinforcement plate formed of polycarbonate disposed between the plurality of first quarter-wave plates and the plurality of second quarter-wave plates, and the resin plate.

4. The polarization module according to claim 1, wherein the polarization module satisfies:

$$0.8(mm) < d < X\tan((\pi-\theta)/2) \text{ (mm)}$$

where "X" represents a value that is one half of the pitch of pixels of the display panel mounted to the second side of the polarizer opposite to the first side thereof facing the transparent resin plate; "θ" represents the viewing angle of the pixels; a light source of the display panel is a point light source; "d" represents the distance of the point light source from the surface of the transparent resin plate opposite to the surface facing the polarizer.

5. The polarization module according to claim 1, wherein the plurality of first quarter-wave plates and the plurality of second quarter-wave plates are disposed over a single polarizer.

6. The polarization module according to claim 1,
wherein the size of the plurality of first quarter-wave plates and the size of the plurality of the second quarter-wave plates is based on the size of respective pixel region of the display panel.

7. The polarization module according to claim 1,
wherein each of the plurality of first quarter-wave plates and each of the plurality of second quarter-wave plates are disposed in an in-plane direction of the polarizer such that each of the plurality of first quarter-wave plates and each of the plurality of second quarter-wave plates alternate in each of two axial directions orthogonal to each other.

8. The polarization module according to claim 1,
wherein the distance between the light source of the display panel mounted on the second side of the polarizer and the surface of the resin plate opposite to the surface facing the polarizer is set further based on a viewing angle of the pixels.

9. The polarization module according to claim 1,
wherein the plurality of first quarter-wave plates and the plurality of second quarter-wave plates are attached to the first side of the polarizer through a bonding layer.

10. The polarization module according to claim 1,
wherein the transparent resin plate is attached to the plurality of first quarter-wave plates and the plurality of second quarter-wave plates through a bonding layer.

11. The polarization module according to claim 1,
wherein the plurality of first quarter-wave plates are identical to the plurality of second quarter-wave plates except that the plurality of second quarter-wave plates are disposed upside down on the polarizer compared to the plurality of first quarter-wave plates.

12. An image display apparatus comprising:
a display panel having a first pixel region for displaying an image for a right eye and a second pixel region for displaying an image for a left eye; and
a polarization module disposed on the display panel and including:
a polarizer;
a plurality of first quarter-wave plates disposed on a first side of the polarizer such that their optical axes are tilted at 45 degrees with respect to a polarization axis of the polarizer;
a plurality of second quarter-wave plates disposed on the first side of the polarizer such that their optical axes are tilted at 45 degrees with respect to the polarization axis of the polarizer in a direction opposite to the tilting direction of the optical axes of the first quarter-wave plates; and
a transparent resin plate having optical isotropy disposed on the plurality of first quarter-wave plates and the plurality of second quarter-wave plates, the display panel being mounted to a second side of the polarizer opposite to the first side, the plurality of first quarter-wave plates being disposed to face the first pixel region of the display panel, the plurality of second quarter-wave plates being disposed to face the second pixel region of the display panel,
wherein a distance between a light source of the display panel mounted on the second side of the polarizer and a surface of the transparent resin plate opposite to a surface facing the polarizer is set based on pitch of pixels of the display panel.

13. The image display apparatus according to claim 12, wherein the pixels comprise self-emitting elements including light emitting diodes (LEDs) or organic LEDs.

14. A polarization module comprising:
a polarizer;
a plurality of first quarter-wave plates disposed on the polarizer such that their optical axes are tilted at 45 degrees with respect to a polarization axis of the polarizer;
a plurality of second quarter-wave plates disposed on the polarizer such that their optical axes are tilted at 45 degrees with respect to the polarization axis of the polarizer in a direction opposite to the tilting direction of the optical axes of the first quarter-wave plates;
a transparent resin plate disposed on the plurality of first quarter-wave plates and the plurality of second quarter-wave plates, wherein the transparent display plate is formed of polymethyl methacrylate (PMMA) and has optical isotropy; and
a reinforcement plate formed of polycarbonate disposed between the plurality of second quarter-wave plates and the transparent resin plate,
wherein the polarization module satisfies $$0.8(\text{mm}) < d < X \tan((\pi-\theta)/2) \text{ (mm)}$$

where "X" represents a value that is one half of the pitch of pixels of the display panel mounted to a surface of the polarizer opposite to a surface thereof facing the transparent resin plate; "θ" represents the viewing angle of the pixels; a light source of the display panel is a point light source; "d" represents a distance of the point light source from a surface of the transparent resin plate opposite to a surface of the transparent resin plate facing the polarizer.

* * * * *